(12) United States Patent
Otsuka et al.

(10) Patent No.: US 8,468,116 B2
(45) Date of Patent: Jun. 18, 2013

(54) RULE CREATION METHOD AND RULE CREATING APPARATUS

(75) Inventors: Hiroshi Otsuka, Kawasaki (JP); Kuniaki Shimada, Kawasaki (JP); Atsuji Sekiguchi, Kawasaki (JP); Masazumi Matsubara, Kawasaki (JP); Kenji Morimoto, Imizu (JP); Yuji Wada, Kawasaki (JP); Yukihiro Watanabe, Kawasaki (JP); Yasuhide Matsumoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 662 days.

(21) Appl. No.: 12/489,211

(22) Filed: Jun. 22, 2009

(65) Prior Publication Data

US 2010/0070458 A1 Mar. 18, 2010

(30) Foreign Application Priority Data

Sep. 17, 2008 (JP) ................................. 2008-238667

(51) Int. Cl.
*G06F 17/00* (2006.01)
*G06N 5/00* (2006.01)

(52) U.S. Cl.
USPC ......................................................... 706/59

(58) Field of Classification Search
USPC ........................................................ 706/59
See application file for complete search history.

(56) References Cited

U.S. PATENT DOCUMENTS

| 6,546,416 | B1 * | 4/2003 | Kirsch | 709/206 |
| 7,568,009 | B2 * | 7/2009 | Kirstein | 709/206 |
| 2006/0004875 | A1 | 1/2006 | Baron et al. | |
| 2008/0005186 | A1 * | 1/2008 | Ayachitula et al. | 707/200 |
| 2008/0021917 | A1 | 1/2008 | Baker et al. | |
| 2008/0301081 | A1 * | 12/2008 | Karnik et al. | 706/48 |

FOREIGN PATENT DOCUMENTS

| EP | 1 998 252 | 12/2008 |
| JP | A 2003-30257 | 1/2003 |

OTHER PUBLICATIONS

UK Search Report under Section 17 mailed Dec. 17, 2012.

* cited by examiner

*Primary Examiner* — Kakali Chaki
*Assistant Examiner* — Ababacar Seck
(74) *Attorney, Agent, or Firm* — Greer, Burns & Crain, Ltd.

(57) ABSTRACT

An information processing apparatus obtains, from an F-CMDB for managing CIs regarding resources and their attribute values, CIs with the type and attribute of the resource for which a rule is to be created for use at the time of comparison between CIs. From the F-CMDB for managing CIs of SRC and CIs of DST, and relations between SRC and DST together, the information processing apparatus also obtains CI pairs with SRC including any CI previously obtained and also having a relation corresponding to the determination objective of the rule. Then, the information processing apparatus subjects CIs of SRC with the same classification as that defined in a CI of DST to grouping. Then, the information processing apparatus stores a group of CIs of SRC obtained through grouping in a rule DB as a rule for the determination objective.

8 Claims, 11 Drawing Sheets

| OBJECTIVE | TYPE |
|---|---|
| DIFFERENCE | CONNECTED |
| VERIFICATION | MODELED |

FIG.9

| CI NAME | CLASSIFICATION | ID | OS |
|---|---|---|---|
| SERVER | PLAN | p001 | Windows XP Professional |
| SERVER | PLAN | p002 | Windows XP Professional |
| SERVER | PLAN | p003 | Redhat Enterprise Linux 4.0 |
| NETWORK | REAL | r004 | IOS |
| SERVER | REAL | r001 | WinXP Pro |
| SERVER | REAL | r002 | WinXP Pro |
| SERVER | REAL | r003 | RHEL 4.0 |
| NETWORK | REAL | r004 | IOS |
| SERVER | SPEC | s001 | Windows XP Professional |
| SERVER | SPEC | s002 | Redhat Enterprise Linux 4.0 |
| SERVER | SPEC | s002 | Redhat Enterprise Linux 4.0 |
| NETWORK | SPEC | s003 | IOS |

FIG.10

| CI NAME | CLASSIFICATION | ID | OS |
|---|---|---|---|
| SERVER | PLAN | p001 | Windows XP Professional |
| SERVER | PLAN | p002 | Windows XP Professional |
| SERVER | PLAN | p003 | Redhat Enterprise Linux 4.0 |
| SERVER | REAL | r001 | WinXP Pro |
| SERVER | REAL | r002 | WinXP Pro |
| SERVER | REAL | r003 | RHEL 4.0 |
| SERVER | SPEC | s001 | Windows XP Professional |
| SERVER | SPEC | s002 | Redhat Enterprise Linux 4.0 |

FIG.11

| ID | TYPE | SRC | DST |
|---|---|---|---|
| 001 | MODELED | p001 | s001 |
| 002 | MODELED | p002 | s001 |
| 003 | MODELED | p003 | s002 |
| 004 | MODELED | r001 | s001 |
| 005 | MODELED | r002 | s001 |
| 006 | MODELED | r003 | s002 |
| 007 | CONNECTED | p001 | p004 |
| 008 | CONNECTED | p002 | p004 |
| 009 | CONNECTED | p003 | p004 |
| 010 | CONNECTED | r001 | r004 |
| 011 | CONNECTED | r002 | r004 |

FIG.12

| ID | SRC | DST |
|---|---|---|
| 001 | p001 | s001 |
| 002 | p002 | s001 |
| 003 | p003 | s002 |
| 004 | r001 | s001 |
| 005 | r002 | s001 |
| 006 | r003 | s002 |

| GROUPING NAME | GROUP ID | GROUP MEMBER |
|---|---|---|
| VERIFICATION | s001 | Windows XP Professional |
| VERIFICATION | s001 | WinXP Pro |
| VERIFICATION | S002 | RHEL 4.0 |
| VERIFICATION | s002 | Redhat Enterprise Linux 4.0 |

| GROUP ID | GROUP MEMBER |
|---|---|
| s001 | Windows XP Professional |
| s001 | WinXP Pro |
| S002 | RHEL 4.0 |
| s002 | Redhat Enterprise Linux 4.0 |

13b

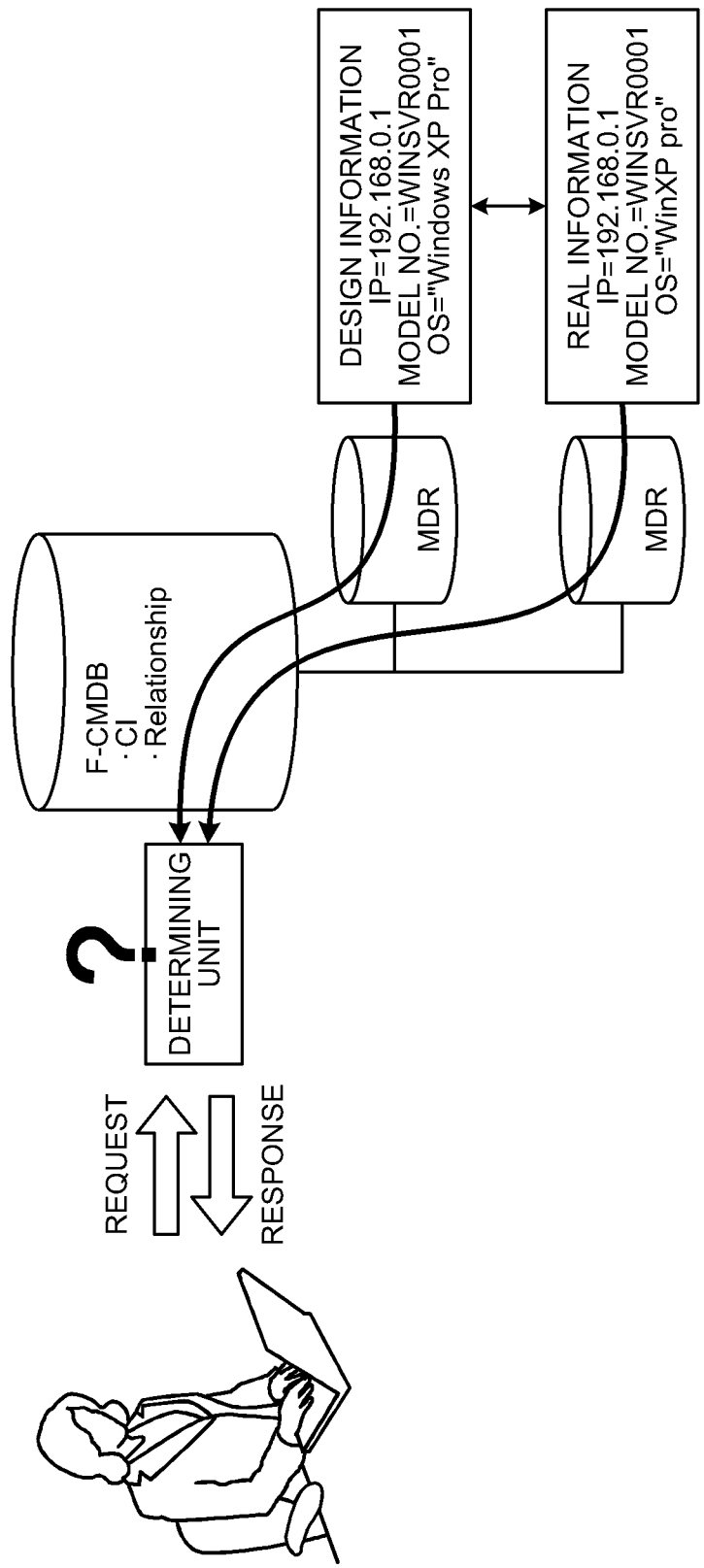

RULE CREATION METHOD AND RULE CREATING APPARATUS

CROSS-REFERENCE TO RELATED APPLICATION

This application is based upon and claims the benefit of priority of the prior Japanese Patent Application No. 2008-238667, filed on Sep. 17, 2008, the entire contents of which are incorporated herein by reference.

FIELD

The embodiments discussed herein are directed to a rule creation method, and a rule creating apparatus to be applied to an information processing apparatus that uses a Configuration Management Database (CMDB) for managing information about resources that configure an information system, thereby comparing components regarding theses resources.

BACKGROUND

An information system is composed of various resources, such as hardware, software, and networks. With these components organically coupled to each other to achieve functions, operational objectives as a system are attained.

As such, resources that constitutes a system have become complex, while expectations for the system are growing with the advance of Information Technology (IT). There are concerns such that, for example, a flaw in system construction, a flaw in documents, and a flaw in work history may occur.

Meanwhile, as a database for managing information about resources that configure an information system by virtually unifying a plurality of types of database for managing information regarding hardware and software that configure the information system, a Federated Configuration Management Database (F-CMDB) has been known.

In recent years, by using such an F-CMDB, a verification for comparing the configuration at a design stage and the configuration at an implementation stage or a time-series comparison for comparing configurations between arbitrary points in time is performed to manage the configuration of an IT system.

However, for comparison of components in an information system, if attribute values of the respective components are stored in an F-CMDB in different formats or representations, components even with the same attribute values may be determined as not identical, thereby making it impossible to obtain a correct determination result.

For example, as depicted in FIG. 16, when a query for verification of an Operating System (OS) of a server is input by an administrator, "Windows XP Professional (registered trademark)" and "WinXP pro (registered trademark)" are obtained via Management Data Repositories (MDRs) and an F-CMDB as an attribute value at a design stage and an attribute value at an implementation stage, respectively. Although both components are in fact equivalent to each other, these components are determined as not identical due to different character strings.

Meanwhile, Japanese Laid-open Patent Publication No. 2003-30257 discloses a product configuration management system in which a rule for summarizing product configurations before and after change is input by a product designer, a manufacturer, or the like, and abstraction is performed to sum up the relation among a plurality of components in the product by using the rule, thereby comparing product configurations before and after change.

The system disclosed in the patent gazette mentioned above, however, relegates creation of a rule for abstraction of product configurations to a person, such as a designer or a manufacturer. Therefore, enormous efforts are required to create the rule and, as a result, configuration comparison of an information system cannot be efficiently made.

SUMMARY

According to an aspect of the invention, a rule creating apparatus includes a configuration management database for managing components regarding resources that configure an information system and attribute values thereof and also managing a component defined as a first related element, a component defined as a second related element, and a relation between the first and second related elements; a rule storage unit that stores therein, in association with a determination objective at the time of comparing the components, a rule for use at the time of using the determination objective; a component obtaining unit that obtains, from the configuration management database, a component with a type and attribute of a resource for which the rule is to be created; a component-pair obtaining unit that obtains, from the configuration management database, component pairs with the first related element including any component obtained by the component obtaining unit and also having a relation corresponding to the determination objective for the rule; a grouping unit that groups components of the first related element with a same classification as a classification defined in the component obtained as the second relate element by the component-pair obtaining unit; and a rule storing unit that stores, as a rule for the determination objective, a group of components of the first related element subjected to grouping by the grouping unit in the rule storage unit.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 8 is a diagram of an example of a cross-reference table for determination objectives and relationships;

FIG. 9 is a diagram of an example of a CI list;

FIG. 10 is a diagram of an example of a component (hereinafter, referred to as CI) list after a rule-creation target CI is obtained;

FIG. 11 is a diagram of an example of a Relationship list;

FIG. 12 is a diagram of an example of a Relationship list after CI pairs are obtained;

FIG. 13 is a diagram of an example of a grouping list;

FIG. 16 is a diagram for explaining configuration comparison of an information system according to a conventional technology.

DESCRIPTION OF EMBODIMENTS

Preferred embodiments of the present invention will be explained with reference to accompanying drawings.

Figure 1:
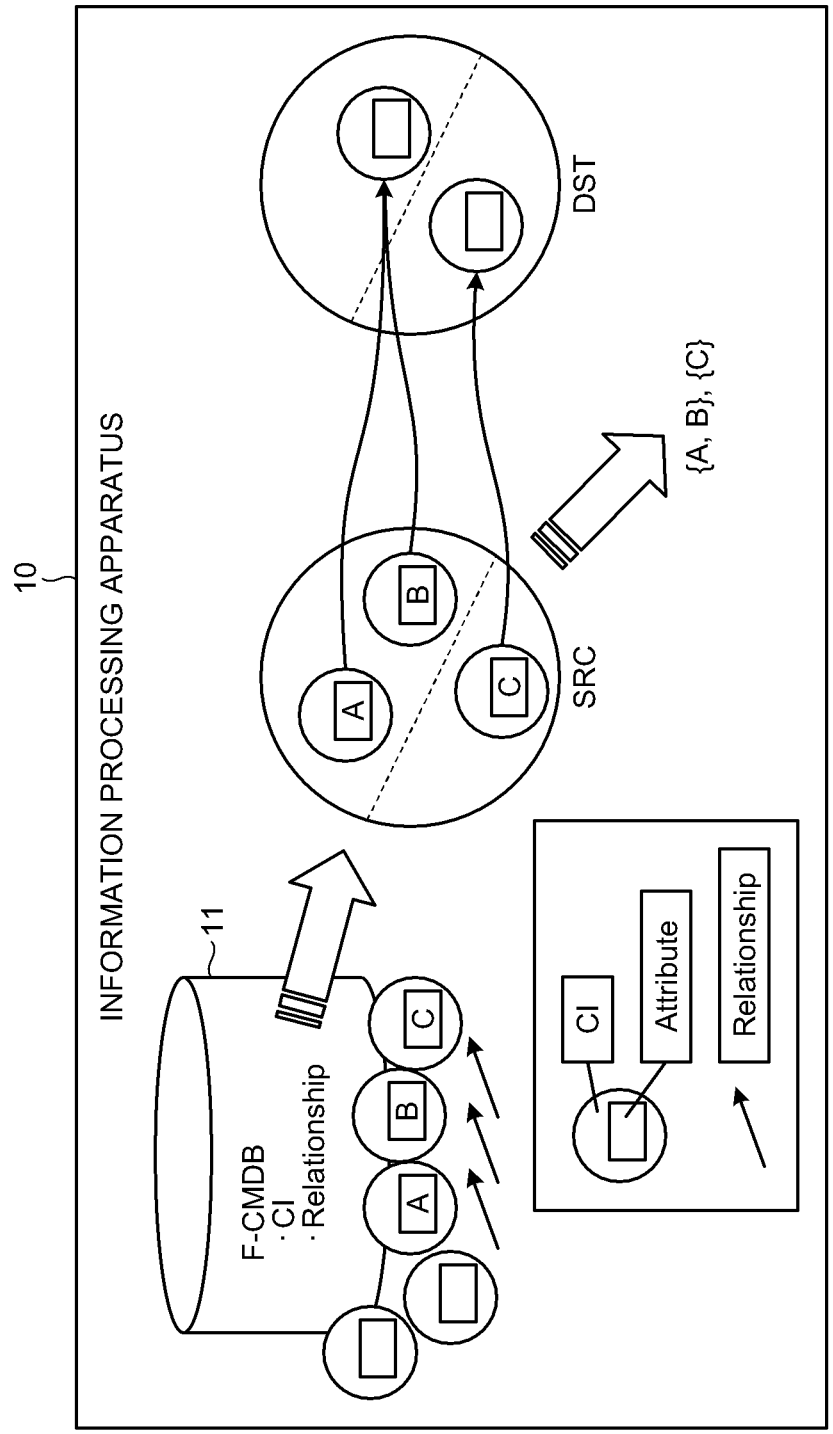
FIG. 1 is a diagram for explaining rule creation according to an embodiment.

First, rule creation according to the present embodiment is explained. FIG. 1 is a diagram for explaining rule creation according to the present embodiment.

An information processing apparatus 10 depicted in FIG. 1 uses an F-CMDB for managing information about resources that configure an information system to compare attribute values of CIs regarding the resources. In particular, what is excellent is that a rule for a determination objective at the time of CI comparison (a grouping list indicative of a relation among CIs regarding a specific type and a specific attribute of the resources) is applied for comparison of the configuration.

In this information processing apparatus 10, in rule creation, a structural feature of the F-CMDB, that is, Relationship, that defines a relation among CIs is used to automatically generate rule.

That is, the information processing apparatus 10 groups CIs of SRC (source) with the same CI of DST (destination) among CI pairs with SRC and DST for which Relationship is defined, identifying the CIs of the same group.

As depicted in FIG. 1, in an F-CMDB 11, pieces of CI information spanning a plurality of individual databases are virtually unified. For a predetermined attribute, a CI with an attribute value A, a CI with an attribute value B, and a CI with an attribute value C are managed. Note in the drawing that circles each represent a CI, labels each represent an attribute, and arrows each represent Relationship.

Here, with reference to SRC of Relationship, the CIs with the attribute values A, B, and C can only be recognized as heterogeneous with different attribute values. However, Relationship of the CI with the attribute value A and Relationship of the CI with the attribute value B both point to the same DST, and therefore they can be regarded as homogeneous in essence even with different labels.

Thus, when the CI with the attribute value A and the CI with the attribute value B are grouped as a rule to be stored, they can be identified when the attributes of these CIs are compared.

In this manner, in the present embodiment, with the expertise explained above, CIs of SRC are grouped based on CIs of DST of Relationship, and the grouped CIs are taken as a rule to be held. With this, the rule can function as a thesaurus.

As a result, even if the formats and representations describing attribute values of CIs are varied, CIs can be identified when the attributes of the components are heterogeneous in essence, thereby accurately comparing configurations of the information system.

Furthermore, in the present embodiment, the administrator can register attribute values of CIs in an F-CMDB without being aware of consistency in format and representation. In addition, it is not required to make consistency in format and representation after registrations of the CIs. With this, the number of processes for maintenance of the F-CMDB can be effectively reduced.

Figure 2:
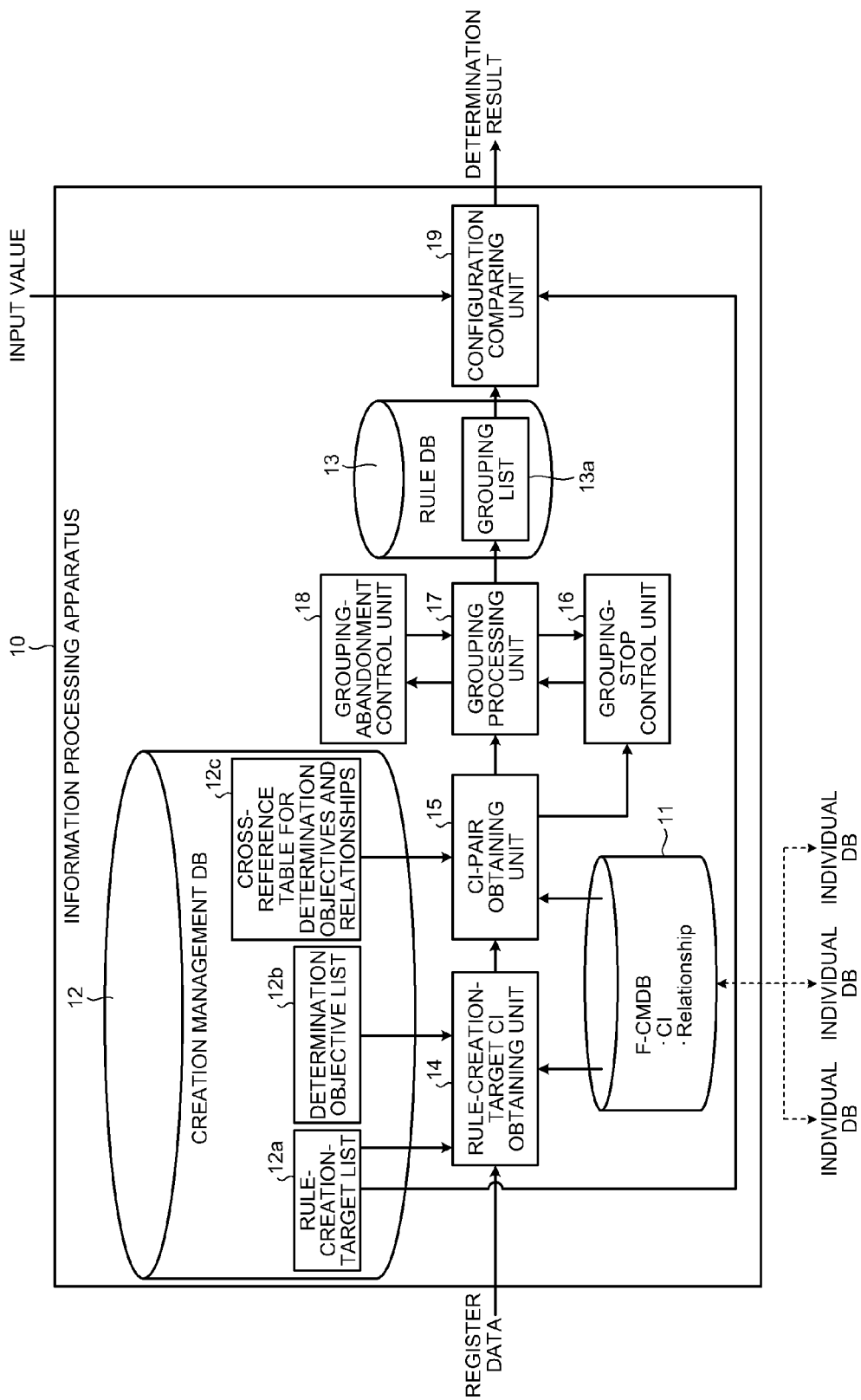
FIG. 2 is a functional block diagram of the configuration of an information processing apparatus according to the present embodiment.

Next, the configuration of the information processing apparatus according to the present embodiment is explained. FIG. 2 is a functional block diagram of the configuration of the information processing apparatus according to the present embodiment. Note that FIG. 2 depicts only the components necessary for explaining the functions of the information processing apparatus 10 according to the present embodiment, although the information processing apparatus 10 in practice includes functional units other than those depicted in FIG. 2.

As depicted in FIG. 2, this information processing apparatus 10 includes the F-CMDB 11, a creation management database (DB) 12, a rule DB 13, a rule-creation-target CI obtaining unit 14, a CI-pair obtaining unit 15, a grouping-stop controlling unit 16, a grouping processing unit 17, a grouping-abandonment controlling unit 18, and a configuration comparing unit 19.

The F-CMDB 11 is a database for managing information about resources that configure an information system, virtually unifying individual databases of a plurality of types for managing information regarding hardware and software.

That is, the information regarding resources (CIs) and a relation among the CIs are stored in MDRs each included in an individual database. An operator, such as an administrator, operates across these individual databases between the F-CMDB and the MDRs, thereby allowing a data search and export.

The creation management DB 12 is a database having stored therein various information regarding rule creation. For example, the creation management DB 12 has stored therein a rule-creation-target list 12a having stored therein types and attributes of resources for which a rule is to be created, a determination objective list 12b having stored therein determination objectives for which a rule is to be created, and a cross-reference table for determination objectives and relationships 12c, having stored therein a relation between determination objectives and relation (Relationship), all together.

The rule DB 13 is a database having stored therein a rule to be used for each determination objective at the time of CI comparison. For example, the rule DB 13 has stored therein a grouping list 13a having stored therein a CI grouping for each determination objective.

The rule-creation-target CI obtaining unit 14 is a processing unit that obtains CIs with a type and attribute of a resource for which a rule is to be created, querying the F-CMDB 11 on condition of matching the type and attribute of a resource of a CI at the time of accepting registration of that CI in the F-CMDB 11, and obtaining, from a response from the F-CMDB 11, CIs for which a rule is to be created. Details of the process of the rule-creation-target CI obtaining unit 14 will be explained further below with reference to FIGS. 9 and 10.

The CI-pair obtaining unit 15 is a processing unit that uses the F-CMDB 11 to obtain CI pairs for which a rule is to be created, querying the F-CMDB 11 to request CI pairs with SRC including any CI obtained by the rule-creation-target CI obtaining unit 14 and also having a relation corresponding to the determination objective for which a rule is to be created, and obtaining, from a response from the F-CMDB 11, CI pairs for which a rule is to be created. Details of the process of the CI-pair obtaining unit 15 will be explained further below with reference to FIGS. 11 and 12.

The grouping-stop controlling unit 16 is a processing unit that stops CI grouping being performed by the grouping processing unit 17, which will be explained further below.

For example, when a ratio between the number of types of attribute value of CIs obtained by the rule-creation-target CI obtaining unit 14 and the total number of CIs is greater than a predetermined threshold, it can be detected that there are a large number of CIs for which a rule is to be created that can be grouped. In such cases, grouping is not effective, and therefore grouping is stopped.

When any CI defined with the same classification as that of a CI of DST is included in the CIs of SRC obtained by the CI-pair obtaining unit 15, this is contrary to the intention of classifying the CIs of SRC based on DST of Relationship, resulting in allowing the same CIs to be included in a plurality of groups after grouping. Also in such cases, grouping is stopped so as to avoid a determination using such contradiction at the time of comparing the attribute values of the CIs.

The grouping processing unit 17 is a processing unit that groups CIs for which a rule to be created. To detect CIs whose attributes are identical in essence even with thee attribute values of the CIs in different formats and representations, the grouping processing unit 17 groups CIs of SRC with the same classification as that defined in the CIs of DST of Relationship obtained by the CI-pair obtaining unit 15. Details will be explained further below with reference to FIG. 4.

The grouping-abandonment controlling unit 18 is a processing unit that abandons a group obtained through grouping by the grouping processing unit 17.

For example, when the number of groups obtained through grouping by the grouping processing unit 17 is equal to or greater than the number of types of attribute value of the CIs obtained by the rule-creation-target CI obtaining unit 14, inefficient grouping, such as a case where one or more CIs are grouped into one group, can be verified. Therefore, to avoid registration of such inefficient grouping as a rule, grouping is abandoned.

Also, when a group obtained through grouping by the grouping processing unit 17 includes a CI with the same attribute value as the attribute value of a CI of another group or as the attribute value of a CI not subjected to grouping, if grouping is allowed to continue, the same CI is allowed to be included in a plurality of groups, leading to a determination using such contradiction at the time of comparing the attribute values of the CIs. To avoid such contradiction, grouping is abandoned.

The configuration comparing unit 19 is a processing unit that compares components of resources that configure an information system, accepting input values, such as an attribute, attribute value, and determination objective, about a resource as a comparison target via an input unit or the like not shown and determining whether the attribute values of the CIs are equal to each other with reference to the groupings stored in the rule DB 13 as the grouping list 13a. Details of the process will be explained further below with reference to FIG. 5.

Next, various process flows of the information processing apparatus according to the present embodiment are explained. In the following, (1) a rule creation process, (2) a grouping process, and then (3) a configuration comparison process of comparing attributes of CIs by using a rule are explained.

(1) Rule Creation Process

Figure 3:
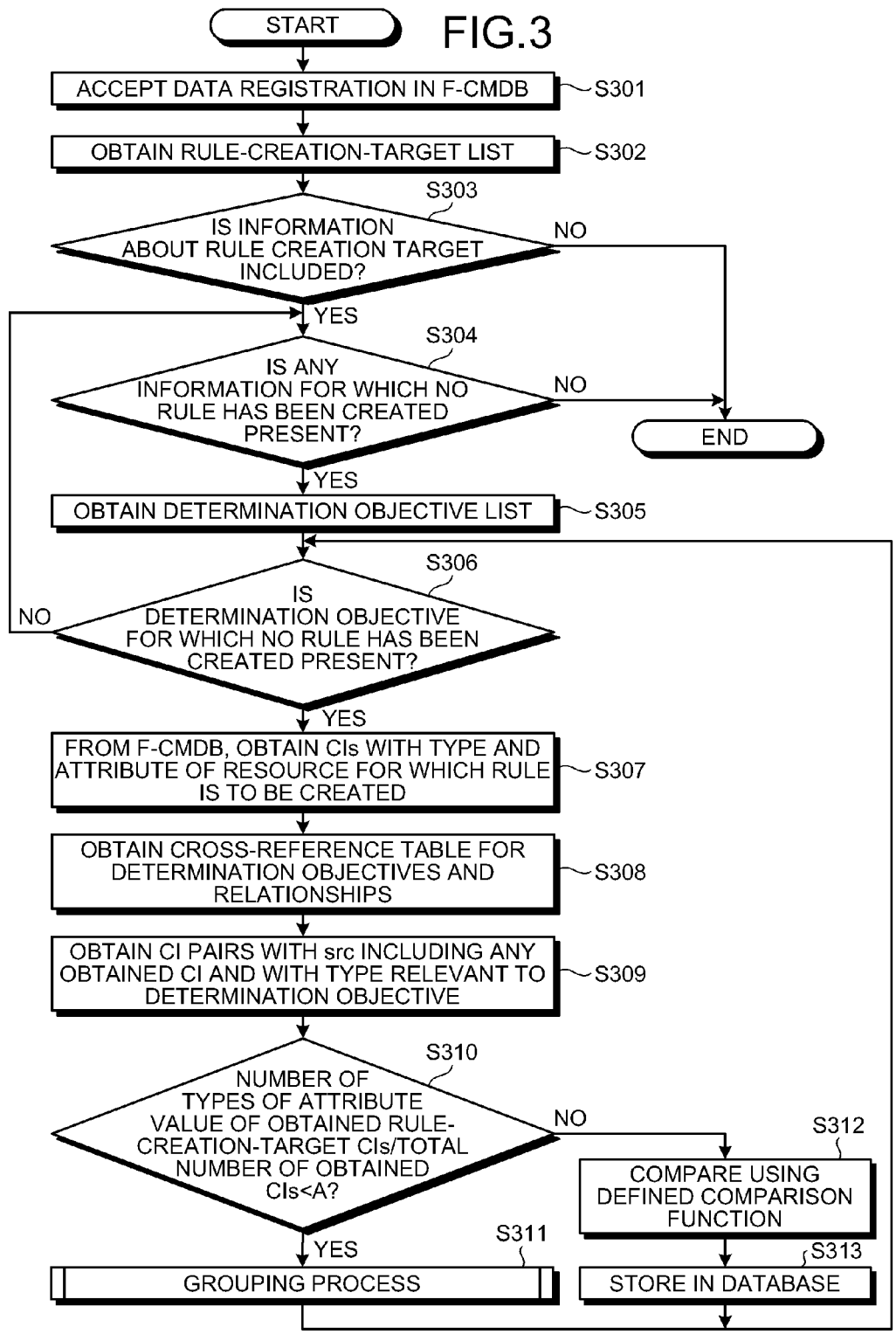
FIG. 3 is a flowchart of the procedure of a rule creation process according to the present embodiment.

As explained above, the rule creation process according to the present embodiment is now explained. FIG. 3 is a flowchart of the procedure of the rule creation process according to the present embodiment. In this FIG. 3, it is assumed that the process starts upon accepting registration of a CI in the F-CMDB 11. Alternatively, the process may start with a setting of a regular time or upon request from the administrator.

As depicted in FIG. 3, the information processing apparatus 10 is in a wait state until accepting registration of a CI in the F-CMDB 11. When registration of a CI is accepted (Step S301), the rule-creation-target CI obtaining unit 14 obtains the rule-creation-target list 12a stored in the creation management DB 12 (Step S302).

The rule-creation-target CI obtaining unit 14 then determines whether the combination of the type and attribute of the resource accepted at the time of registration is present in the rule-creation-target list 12a (Step S303). When the combination is not present in the rule-creation-target list 12a (No at Step S303), there is no need to generate a rule, and therefore the process ends.

When the combination is present in the rule-creation-target list 12a (Yes at Step S303), the rule-creation-target CI obtaining unit 14 further determines whether any CI whose registration has been accepted but for which no rule has been created is left for the combination of the type and attribute of the resource (Step S304). If rules have been created for all CIs (No at Step S304), the process ends.

Figure 6:
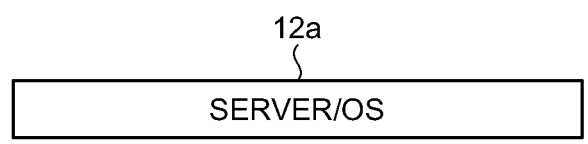
FIG. 6 is a diagram of an example of a rule creation list.

For example, if "server/OS" has been accepted as the type and attribute of the resource accepted at the time of registration and the rule-creation-target list 12a depicted in FIG. 6 is obtained from the creation management DB 12, "server/OS" is present in the rule-creation-target list 12a, and it is therefore determined that a CI whose registration has been accepted but for which no rule has been created is left. Also, since any subsequent process has not yet been performed and the CI whose registration has been accepted is left as it is, it is determined that a CI whose registration has been accepted but for which no rule has been created is left.

In the example of FIG. 6, "server/OS" is exemplarily depicted as the type and attribute of the resource. However, the combination of the type and attribute of the resource set in the rule-creation-target list can be arbitrarily set based on the components of the information system.

Returning to the explanation of FIG. 3, when a CI whose registration has been accepted but for which no rule has been created is left (Yes at Step S304), the rule-creation-target CI obtaining unit 14 obtains the determination objective list 12b stored in the creation management DB 12 (Step S305) to determine whether any determination objective for which no rule has been created is present (Step S306).

Figure 7:
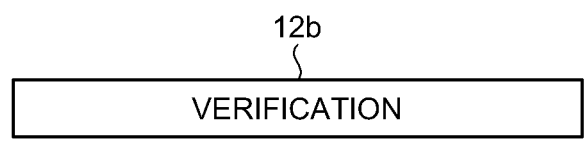
FIG. 7 is a diagram of an example of a determination objective list.

For example, when the determination objective list 12b depicted in FIG. 7 is obtained from the creation management DB 12, "verification" is present in this determination objective list 12b. Therefore, in the first determination, it is determined that a determination objective for which no rule has been created is present. After a rule is created for "verification", it is determined that a determination objective for which no rule has been created is not present.

In the example of FIG. 7, "verification" is exemplarily depicted as a determination objective. However, there is a case in which a plurality of determination objectives, such as "difference (time-series comparison)", are provided to a combination of the type and attribute of one resource. In this case, the subsequent processes are performed for each determination objective.

Returning to FIG. 3, when any determination objective for which no rule has been created is present (Yes at Step S306), the rule-creation-target CI obtaining unit 14 queries the F-CMDB 11 on condition of matching the type and attribute of the resource of the CI, and obtains, from a response from the F-CMDB 11, CIs for which a rule is to be created (Step S307).

For example, it is assumed that a CI list depicted in FIG. 9 is managed in the F-CMDB 11 through virtual unification. In this case, based on a CI name of "server" and an attribute of "OS", the F-CMDB 11 extracts a CI list depicted in FIG. 10 corresponding to the type and attribute of the resource "server/OS" for which a rule is to be created, and then returns the extracted CI list as a response to the rule-creation-target CI obtaining unit 14.

In the example of FIG. 9, a system for providing a CI identifier is used in which a lower-case letter of the initial of the classification for defining the CI is provided (for example, "p" is provided for Plan) and a serial number is provided thereafter. Alternatively, uniquely-identifiable serial numbers may be provided to CIs of all classifications.

Returning to FIG. 3, after the rule-creation-target CIs are obtained, the CI-pair obtaining unit 15 obtains the cross-reference table for determination objectives and relationships 12c, from the creation management DB 12 (Step S308), requests the F-CMDB 11 for CI pairs with SRC including any CI obtained by the rule-creation-target CI obtaining unit 14 and also having a relation corresponding to the determination objective for which a rule is to be created in the cross-reference table for determination objectives and relationships 12c, and then obtains, from a response from the F-CMDB 11, a set of CI pairs for which a rule is to be created (Step S309).

For example, it is assumed herein that the CI list depicted in FIG. 10 is obtained as CIs for which a rule is to be created and the cross-reference table for determination objectives and relationships 12c, depicted in FIG. 8 is further obtained from the creation management DB 12. In this case, the condition is such that any CI identifier depicted in FIG. 10 is included in SRC of Relationship. Also, CI pairs with "modeled" corresponding to "verification" in the cross-reference table for determination objectives and relationships 12c, are requested to the F-CMDB 11.

Furthermore, in the F-CMDB 11, when a Relationship list depicted in FIG. 11 is managed through virtual unification as Relationship with SRC including any CI identifier depicted in FIG. 10, CI pairs with "modeled" are extracted as depicted in FIG. 12, and a Relationship list obtained through extraction is returned as a response to the CI-pair obtaining unit 15.

Returning to FIG. 3, after the CI pairs are obtained, the grouping-stop controlling unit 16 determines whether a ratio between a total number of CIs obtained by the rule-creation-target CI obtaining unit 14 and the number of types of attribute value of the CIs is smaller than a threshold A (Step S310).

For example, in the example of FIG. 10, the number of types of attribute value of the CIs is four, that is, (1) "Windows XP Professional (registered trademark)", (2) "Redhat Enterprise Linux 4.0 (registered trademark)", (3) "WinXP pro (registered trademark)", and (4) "RHEL 4.0 (registered trademark)". On the other hand, the total number of CIs is eight. Therefore, the ratio obtained by dividing the number of types of attribute value of the CIs by the total number of CIs is "4/8".

Then, the threshold A to be set for the ratio between the number of types of attribute value of the CIs and the total number of CIs has an upper limit of 1. Here, the threshold A is set at 1. Thus, in the example depicted in FIG. 10, since the ratio obtained by dividing the number of types of attribute value of the CIs by the total number of CIs is "4/8", it is determined that the ratio is below the threshold A.

In the present example, the upper limit of "1" is set as the threshold A. However, the threshold A can be arbitrarily set. As the threshold A is set smaller, grouping is performed only when the number of CIs that can be grouped is small, thereby increasing grouping efficiency. Also, in the present example, the threshold A is set for the ratio between the number of types of attribute value of the CIs and the total number of CIs. Alternatively, a threshold can be set for a difference between the number of types of attribute value of the CIs and the total number of CIs.

Returning to FIG. 3, when the ratio between the total number of CIs and the number of types of attribute value of the CIs is smaller than the predetermined threshold A (Yes at Step S310), a grouping process, which will be explained further below, is performed by the grouping processing unit 17 (Step S311).

When the ratio between the total number of CIs and the number of types of attribute value of the CIs is equal to or greater than the predetermined threshold A (No at Step S310), a character-string comparison is performed among CIs obtained by the rule-creation-target CI obtaining unit 14 (Step S312). A group of CIs determined as identical through the character-string comparison is stored in the rule DB 13 (Step S313).

Then, the processes at Steps S306 to S313 are repeated until neither determination objectives for which no rule has been created nor CIs whose registration has been accepted but for which no rule has been created are present (No at Step S306 and No at Step S304).

(2) Grouping Process

Figure 4:
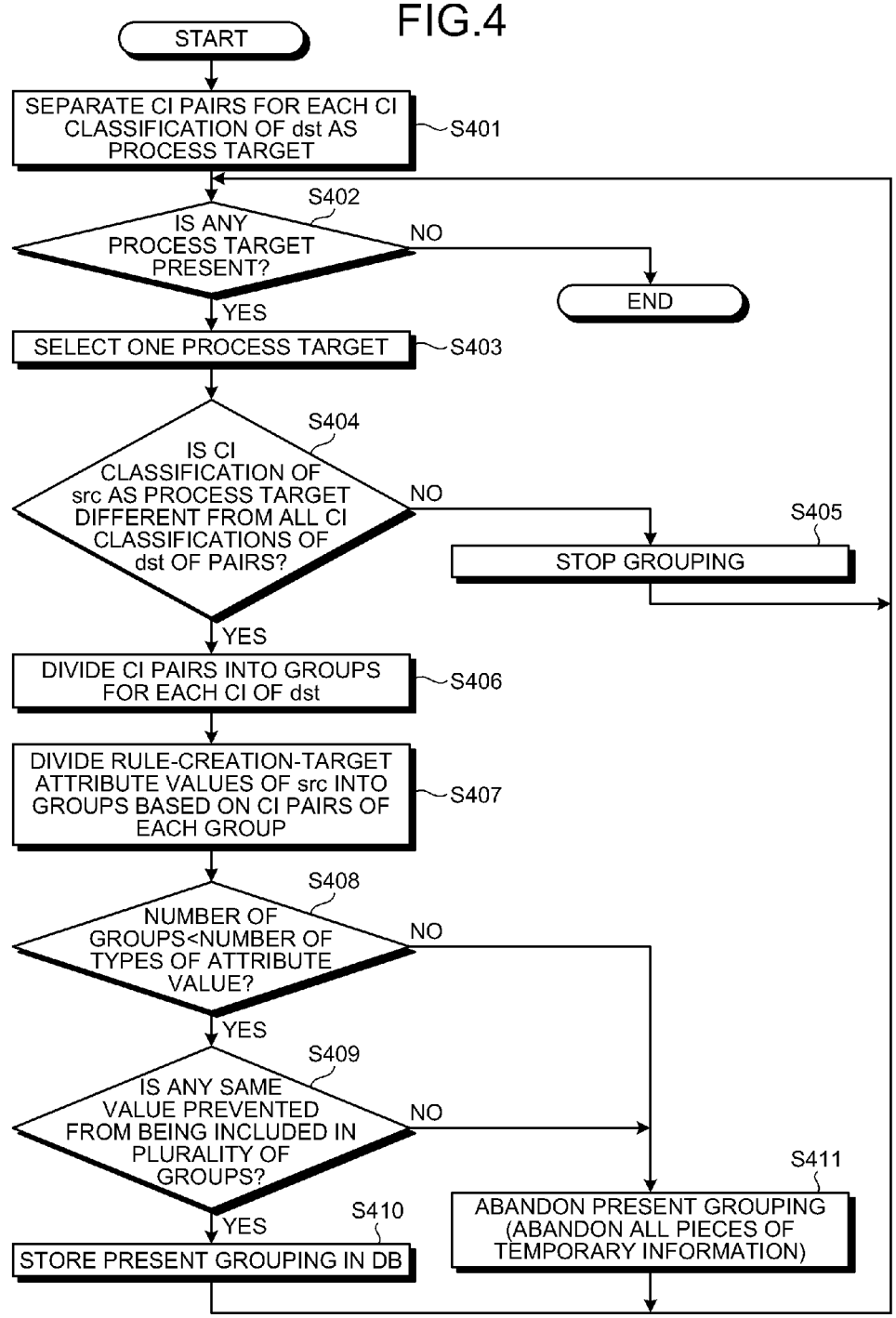
FIG. 4 is a flowchart of the procedure of a grouping process according to the present embodiment.

Next, the grouping process according to the present embodiment is explained. FIG. 4 is a flowchart of the procedure of the grouping process according to the present embodiment. This process corresponds to the process at Step S311 depicted in FIG. 3, and starts when it is determined by the grouping-stop controlling unit 16 that the ratio between the total number of CIs and the number of types of attribute value of the CIs is smaller than the predetermined threshold A (Yes at Step S310).

As depicted in FIG. 4, the grouping processing unit 17 separates sets of CI pairs obtained by the CI-pair obtaining unit 15 for each CI classification of DST of Relationship as process targets (Step S401). When any CI pair as a process target is present (Yes at Step S402), one set of CI pairs as a process target is selected (Step S403). Here, in the initial determination at Step S402, the procedure unconditionally goes to Step S403.

The grouping-stop controlling unit 16 determines whether any CI defined with the same classification as that of a CI of DST is prevented from being included in the CIs of SRC obtained by the CI-pair obtaining unit 15 (Step S404). As a result, when it is determined that any CI defined with the same CI classification as that of DST is included in the CIs of SRC (No at Step S404), grouping is stopped (Step S405), and the process at Step S402 is performed again.

On the other hand, when any CI defined with the same CI classification as that of DST is prevented from being included in the CIs of SRC (Yes at Step S404), the grouping processing unit 17 divides the set of CI pairs as process targets into groups for each CI of DST (Step S406), and divides the rule-creation-target attribute values of SRC into groups based on the CI pairs of each group (Step S407).

For example, in the case of a set of CI pairs depicted in FIG. 12, the set is grouped into Relationships "001", "002", "004", and "005" with a CI classification of DST "s001" and Relationships "003" and "004" with a CI classification of DST "s002".

Subsequently, the grouping-abandonment controlling unit 18 determines whether the number of groups obtained through grouping by the grouping processing unit 17 is smaller than the number of types of attribute value of the CI obtained by the rule-creation-target CI obtaining unit 14 (Step S408). As a result, when the number of groups is equal to or greater than the number of types of attribute value of the CIs (No at Step S408), grouping by the grouping processing unit 17 is abandoned (Step S411), and then the procedure returns to the process at Step S402.

When the number of groups is smaller than the number of types of attribute values of the CIs (Yes at Step S408), the grouping-abandonment controlling unit 18 determines whether any CI with the same attribute value as the attribute value of a CI of any other group or as the attribute value of a CI not subjected to grouping is prevented from being included in the groups obtained through grouping by the grouping processing unit 17 (Step S409).

When it is determined that any CI with the same attribute value as the attribute value of a CI of any other group or as the attribute value of a CI not subjected to grouping is prevented from being included in the groups (Yes at Step S409), the grouping processing unit 17 associates the grouping with the determination objective as a rule creation target for storage in the rule DB 13 (Step S410), and then the procedure returns to the process at Step S402.

For example, when grouping is performed in the example depicted in FIG. 12, an id of the CI of DST is provided as a grouping id. As a grouping for a grouping id of "s001", attribute values of the CIs of SRC "Windows XP Professional (registered trademark)" and "WinXP pro (registered trademark)" and a determination objective "verification" are associated with each other for storage in the rule DB 13. As a grouping for a grouping id of "s002", "Redhat Enterprise Linux 4.0 (registered trademark)" and "RHEL 4.0 (registered trademark)", and a determination objective of "verification" are associated with each other for storage in the rule DB 13 (see FIG. 13).

On the other hand, when any CI with the same attribute value as the attribute value of a CI of any other group or as the attribute value of a CI not subjected to grouping is not prevented from being included in the groups (No at Step S409), the grouping-abandonment controlling unit 18 abandons the grouping by the grouping processing unit 17 (Step S411), and then the procedure returns to the process at Step S402.

Thereafter, when any set of CI pairs with DST of another CI classification is present (Yes at Step S402), the processes at Steps S403 to S411 explained above are repeated. When such set is not present (No at Step S402) the process ends.

(3) Configuration Comparison Process

Figure 5:
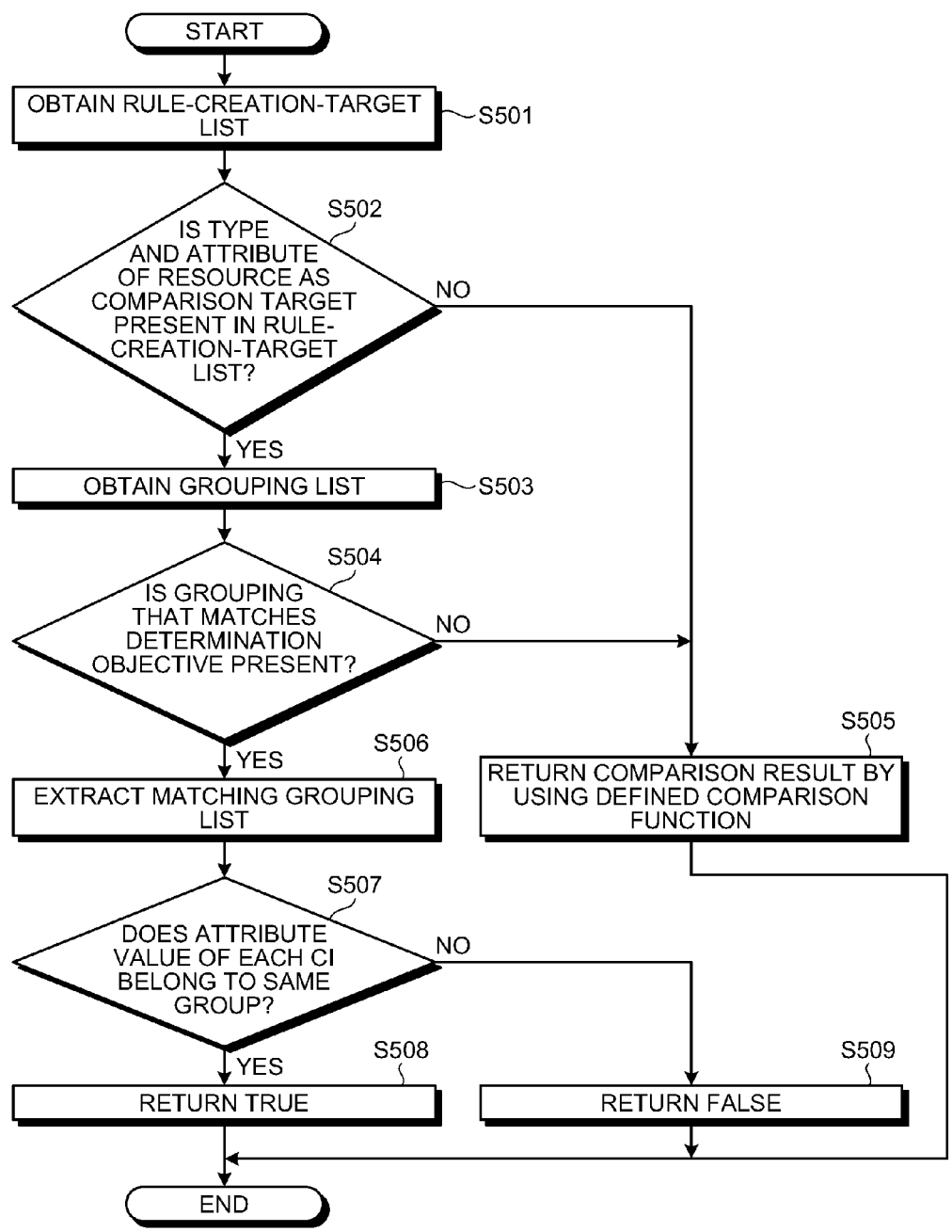
FIG. 5 is a flowchart of the procedure of a configuration comparison process according to the present embodiment.

Next, a configuration comparison process according to the present embodiment is explained. FIG. 5 is a flowchart of the procedure of the configuration comparison process according to the present embodiment. This process starts when an input value, such as an attribute, attribute value, and determination objective of the resource as a comparison target, is accepted via an input unit or the like not shown.

As depicted in FIG. 5, the configuration comparing unit 19 obtains the rule-creation-target list 12a from the creation management DB 12 (Step S501) to determine whether the type and attribute of the resource as a comparison target is present in the rule-creation-target list 12a (Step S502).

Then, when the type and attribute of the resource as a comparison target is present in the rule-creation-target list 12a (Yes at Step S502), the configuration comparing unit 19 obtains the grouping list 13a from the rule DB 13 (Step S503) to further determine whether a grouping that matches the determination objective is present in the grouping list 13a (Step S504).

At this time, when the type and attribute of the resource as a comparison target is not present in the rule-creation-target list 12a or a grouping that matches the determination objective is not present in the grouping list 13a (No at Step S502 or No at Step S504), the configuration comparing unit 19 determines whether the characteristic string matches for the attribute value of the CI as a comparison target, causes the determination result to be displayed on an output unit or the like not shown (Step S505), and then ends the process.

On the other hand, when a grouping that matches the determination objective is present in the grouping list 13a (Yes at Step S504), the configuration comparing unit 19 further extracts a grouping list 13b that matches the determination objective from the grouping list 13a obtained from the rule DB 13 (Step S506).

Figures 14, 15:
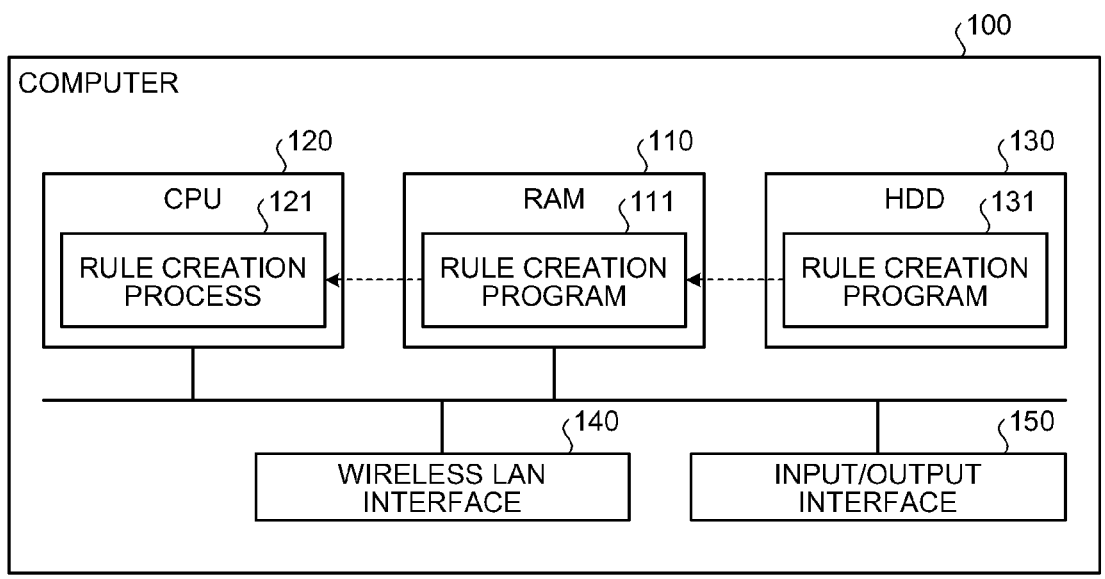
FIG. 14 is a diagram of an example of a grouping list matching a determination objective.
FIG. 15 is a functional block diagram of the configuration of a computer executing a rule creation program according to the present embodiment.

For example, when the attribute and type of the resource is "server/OS", the determination objective is "verification", and the grouping list 13a obtained from the rule DB 13 is as depicted in FIG. 13, the grouping list 13b depicted in FIG. 14 is extracted.

The configuration comparing unit 19 then determines whether the attribute value of each CI belongs to the same group (Step S507). When the attribute value of each CI belongs to the same group (Yes at Step S507), true is returned as a response (Step S508). When the attribute value of each CI does not belong to the same group (No at Step S507), false is returned as a response (Step S509). The process then ends.

For example, in the example depicted in FIG. 14, even when the attribute values of the CIs as comparison targets are "Windows XP Professional (registered trademark)" and "WinXP pro (registered trademark)", they can be identified. Also, even when the attribute values of the CIs as comparison targets are "Redhat Enterprise Linux 4.0 (registered trademark)" and "RHEL 4.0", they can be identified. Irrespectively of variations in format and representation, configuration comparison of the information system can be accurately performed.

As has been explained in the foregoing, in the present embodiment, from an F-CMDB for managing CIs regarding resources and their attribute values, CIs with the type and attribute of the resource for which a rule is to be created for use at the time of comparison between CIs are obtained. From an F-CMDB for managing CIs of SRC and CIs of DST, and relations between SRC and DST together, CI pairs with SRC including any CI previously obtained and also having a relation corresponding to the determination objective of the rule are obtained. Then, CIs of SRC with the same classification as that defined in a CI of DST are subjected to grouping. Then, a group of CIs of SRC obtained through grouping is stored in the rule DB 13 as a rule for the determination objective. With this, configuration comparison of the information system can be efficiently performed.

In the present embodiment, the grouping list stored in the rule DB 13 is used for configuration comparison. Alternatively, the information processing apparatus 10 can be configured to correct the F-CMDB 11 so as to make the format or representation of the attribute values of the grouped CIs uniform.

In the present embodiment, the case is explained in which verification is performed as configuration comparison of the information system. The present embodiment can be similarly applied to the case of time-series comparison in which the configurations at arbitrary points in time are compared with each other.

Also, in the present embodiment, the CIs of SRC are subjected to grouping by using CIs of DST. However, using SRC or DST as a reference for grouping depends on the definition of Relationship. Therefore, depending on how Relationship is defined, CIs of DST can be subjected to grouping by using CIs of SRC.

While the rule creating apparatus is explained in the present embodiment, the configuration of the rule creation apparatus can be achieved by software, thereby obtaining a rule creation program with similar functions as those of the rule creating apparatus. In the following, a computer executing the rule creation program is explained.

FIG. 15 is a functional block diagram of the configuration of the computer executing the rule creation program according to the present embodiment. As depicted in FIG. 15, a computer 100 includes a Random Access Memory (RAM) 110, a Central Processing Unit (CPU) 120, a Hard Disk Drive (HDD) 130, a wireless Local Area Network (LAN) interface 140, and an input/output interface 150.

The RAM 110 is a memory having stored therein programs and the progress of execution of these programs, for example. The CPU 120 is a central processing unit that reads a program from the RAM 110 for execution. The HDD 130 is a disk device having stored therein programs and data. The wireless LAN interface 140 is an interface for connecting the computer 100 to another computer via a wireless LAN. The input/output interface 150 is an interface for connecting an input/output device, such as a display.

The rule creation program executed on this computer 100 is stored in a database of another computer system connected via the wireless LAN interface 140, and is read from this database to be installed on the computer 100. An installed rule creation program 131 is stored in the HDD 130. A rule creation program 111 read onto the RAM 110 is executed by the CPU 120 as a rule creation process 121.

According to an embodiment of the disclosed program, method, and apparatus, configuration comparison of an information system can be efficiently made.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A non-transitory computer readable storage medium containing instructions for creating a rule applied to a comparing apparatus that uses a configuration management database for managing information about resources that configure an information system to compare components regarding the resources or to an information processing apparatus that can be accessed by the comparing apparatus, wherein the instructions, when executed by a computer, cause the computer to perform:

obtaining, from the configuration management database for managing the components regarding the resources and attribute values thereof, a component with a type and attribute of a resource for which a rule for use at the time of comparison of the components is to be created;

obtaining, from the configuration management database for managing a component defined as a first related element, a component defined as a second related element, and a relation between the first and second related elements, component pairs with the first related component including any component obtained at obtaining the component and also having a relation corresponding to a determination objective for the rule;

grouping components of the first related element with a same classification as a classification defined in the component obtained as the second related element at obtaining the component pairs;

storing, as a rule for the determination objective, a group of components of the first related element subjected to the grouping in a rule storage unit that stores the rule in association with the determination objective; and stopping the grouping when a first condition is met, wherein the first condition is that a ratio or difference between a total number of components obtained at obtaining the component and the number of types of attribute value of the components is smaller than a predetermined threshold.

2. A non-transitory computer readable storage medium containing instructions for creating a rule applied to a comparing apparatus that uses a configuration management database for managing information about resources that configure an information system to compare components regarding the resources or to an information processing apparatus that can be accessed by the comparing apparatus, wherein the instructions, when executed by a computer, cause the computer to perform:

obtaining, from the configuration management database for managing the components regarding the resources and attribute values thereof, a component with a type and attribute of a resource for which a rule for use at the time of comparison of the components is to be created;

obtaining, from the configuration management database for managing a component defined as a first related element, a component defined as a second related element, and a relation between the first and second related elements, component pairs with the first related component including any component obtained at obtaining the component and also having a relation corresponding to a determination objective for the rule;

grouping components of the first related element with a same classification as a classification defined in the component obtained as the second related element at obtaining the component pairs;

storing, as a rule for the determination objective, a group of components of the first related element subjected to the grouping in a rule storage unit that stores the rule in association with the determination objective; and stopping the grouping when a first condition is met, wherein the first condition is that a component defined with a same classification as a classification of a component of the second related element is included in the components obtained at obtaining the component pairs as the first related element.

3. A non-transitory computer readable storage medium containing instructions for creating a rule applied to a comparing apparatus that uses a configuration management database for managing information about resources that configure an information system to compare components regarding the resources or to an information processing apparatus that can be accessed by the comparing apparatus, wherein the instructions, when executed by a computer, cause the computer to perform:

obtaining, from the configuration management database for managing the components regarding the resources and attribute values thereof, a component with a type and attribute of a resource for which a rule for use at the time of comparison of the components is to be created;

obtaining, from the configuration management database for managing a component defined as a first related element, a component defined as a second related element, and a relation between the first and second related elements, component pairs with the first related component including any component obtained at obtaining the component and also having a relation corresponding to a determination objective for the rule;

grouping components of the first related element with a same classification as a classification defined in the component obtained as the second related element at obtaining the component pairs;

storing, as a rule for the determination objective, or the first related element subjected to the grouping in a rule storage unit thrall stores the rule in association with the determination objective; and abandoning the grouping when a second condition is met, wherein the second condition is that the number of groups subjected to the grouping is equal to or greater than the number of types of attribute value of the components obtained at obtaining the component.

4. A non-transitory computer readable storage medium containing instructions for creating a rule applied to a comparing apparatus that uses a configuration management database for managing information about resources that configure an information system to compare components regarding the resources or to an information processing apparatus that can be accessed by the comparing apparatus, wherein the instructions, when executed by a computer, cause the computer to perform:

obtaining, from the configuration management database for managing the components regarding the resources and attribute values thereof, a component with a type and attribute of a resource for which a rule for use at the time of comparison of the components is to be created;

obtaining, from the configuration management database for managing a component defined as a first related element, a component defined as a second related element, and a relation between the first and second related elements, component pairs with the first related component including any component obtained at obtaining the component and also having a relation corresponding to determination objective for the rule;

grouping components of the first related element with a same classification as a classification defined in the component obtained as the second related element at obtaining the component pairs;

storing, as a rule for the determination objective, a group of components of the first related element subjected to the grouping in a rule storage unit that stores the rule in association with the determination objective; and abandoning the grouping when a second condition is met, wherein the second condition is that a component with a same attribute value as an attribute value of a component of another group or as an attribute value of a component not subjected to the grouping is included in groups obtained through the grouping.

5. A rule creating apparatus comprising:
a central processing unit;
a configuration management database for managing components regarding resources that configure an information system and attribute values thereof and also managing a component defined as a first related element, a component defined as a second related element, and a relation between the first and second related elements;
a rule storage unit that stores therein, in association with a determination objective at the time of comparing the components, a rule for use at the time of using the determination objective;
a component obtaining unit that obtains, from the configuration management database, a component with a type and attribute of a resource for which the rule is to be created;
a component-pair obtaining unit that obtains, from the configuration management database, component pairs with the first related element including any component obtained by the component obtaining unit and also having a relation corresponding to the determination objective for the rule;
a grouping unit that groups components of the first related element with a same classification as a classification defined in the component obtained as the second relate element by the component-pair obtaining unit;
a rule storing unit that stores, as a rule for the determination objective, a group of components of the first related element subjected to grouping by the grouping unit in the rule storage unit; and
a grouping-stop controlling unit that stops the grouping when a first condition is met,
wherein the first condition is that a ratio or difference between a total number of components obtained by the component obtaining unit and the number of types of attribute value of the components is smaller than a predetermined threshold.

6. A rule creating apparatus comprising:
a central processing unit;
a configuration management database for managing components regarding resources that configure an information system and attribute values thereof and also managing a component defined as a first related element, a component defined as a second related element, and a relation between the first and second related elements;
a rule storage unit that stores therein, in association with a determination objective at the time of comparing the components, a rule for use at the time of using the determination objective;
a component obtaining unit that obtains, from the configuration management database, a component with a type and attribute of a resource for which the rule is to be created;
a component-pair obtaining unit that obtains, from the configuration management database component pairs with the first related element including any component obtained by the component obtaining unit and also having a relation corresponding to the determination objective for the rule;
a grouping unit that groups components of the first related element with a same classification as a classification defined in the component obtained as the second relate element by the component-pair obtaining unit;
a rule storing unit that stores, as a rule for the determination objective, a group of components of the first related element subjected to grouping by the grouping unit in the rule storage unit; and
a grouping-abandonment controlling unit that abandons the grouping when a second condition is met,
wherein the second condition is that the number of groups subjected to the grouping in the grouping unit is equal to or greater than the number of types of attribute value of the components obtained by the component obtaining unit.

7. A rule creating apparatus comprising:
a central processing unit:
a configuration management database for managing components regarding resources that configure an information system and attribute values thereof and also managing a component defined as a first related element, a component defined as a second related element, and a relation between the first and second related elements;

a rule storage unit that stores therein, in association with a determination objective at the time of comparing the components, a rule for use at the time of using the determination objective;

a component obtaining unit that obtains, from the configuration management database, a component with a type and attribute of a resource for which the rule is to be created;

a component-pair obtaining unit that obtains, from the configuration management database, component pairs with the first related element including any component obtained by the component obtaining unit and also having a relation corresponding to the determination objective for the rule;

a grouping unit that groups components of the first related element with a same classification as a classification defined in the component obtained as the second relate element by the component-pair obtaining unit;

a rule storing unit that stores, as a rule for the determination objective, a group of components of the first related element subjected to grouping by the grouping unit in the rule storage unit; and a grouping-stop controlling unit that stops the grouping when a first condition is met, wherein the first condition is that a component defined with a same classification as a classification of a component of the second related element is included in the components obtained by the component-pair obtaining unit as the first related element.

8. A rule creating apparatus comprising:

a central processing unit:

a configuration management database for managing components regarding resources that configure an information system and attribute values thereof and also managing a component defined as a first related element, a component defined as a second related element, and a relation between the first and second related elements;

a rule storage unit that stores therein, in association with a determination objective at the time of comparing the components, a rule for use at the time of using the determination objective;

a component obtaining unit that obtains, from the configuration management database, a component with a type and attribute of a resource for which the rule is to be created;

a component-pair obtaining unit that obtains, from the configuration management database, component pairs with the first related element including any component obtained by the component obtaining unit and also having a relation corresponding to the determination objective for the rule;

a grouping unit that groups components of the first related element with a same classification as a classification defined in the component obtained as the second relate element by the component-pair obtaining unit;

a rule storing unit that stores, as a rule for the determination objective, a group of components of the first related element subjected to grouping by the grouping unit in the rule storage unit; and a grouping-abandonment controlling unit that abandons the grouping when a second condition is met, wherein the second condition is that a component with a same attribute value as an attribute value of a component of another group or as an attribute value of a component not subjected to the grouping by the grouping unit is included in groups obtained through the grouping by the grouping unit.

* * * * *

UNITED STATES PATENT AND TRADEMARK OFFICE
CERTIFICATE OF CORRECTION

PATENT NO. : 8,468,116 B2
APPLICATION NO. : 12/489211
DATED : June 18, 2013
INVENTOR(S) : Hiroshi Otsuka et al.

It is certified that error appears in the above-identified patent and that said Letters Patent is hereby corrected as shown below:

In the Claims:

Col. 13, line 11, after "objective" delete "or" and insert --a group of components of--.

Col. 13, line 12, delete "thrall" and insert --that--.

Signed and Sealed this
Third Day of September, 2013

Teresa Stanek Rea
*Acting Director of the United States Patent and Trademark Office*